Sept. 18, 1962   R. N. BOOTH   3,054,485
SHEET METAL ASSEMBLY

Filed Oct. 30, 1957   2 Sheets-Sheet 1

INVENTOR.
RUSSELL N. BOOTH
BY *Philip J. Zinsmach*
ATTORNEY

Sept. 18, 1962 R. N. BOOTH 3,054,485
SHEET METAL ASSEMBLY
Filed Oct. 30, 1957 2 Sheets-Sheet 2
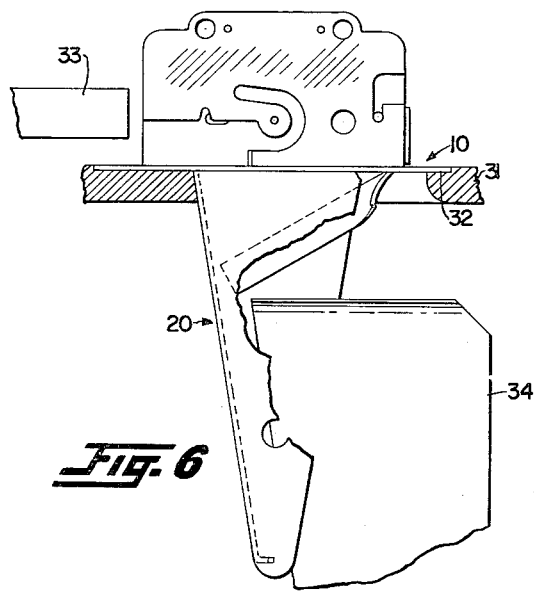
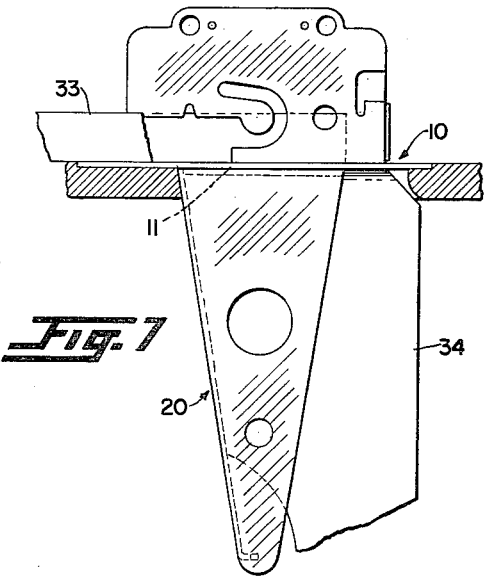
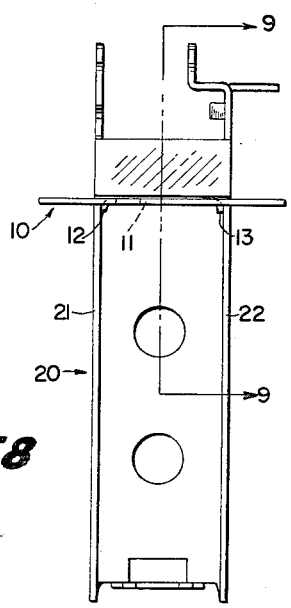
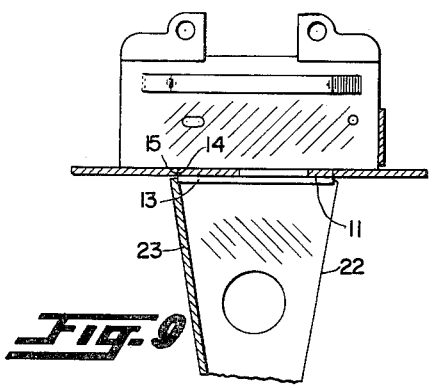
INVENTOR.
RUSSELL N. BOOTH
BY *Philip J. Zwimach*
ATTORNEY United States Patent Office 3,054,485
Patented Sept. 18, 1962

3,054,485
SHEET METAL ASSEMBLY
Russell N. Booth, Lakeville, Minn., assignor to Minneapolis-Honeywell Regulator Company, Minneapolis, Minn., a corporation of Delaware
Filed Oct. 30, 1957, Ser. No. 693,299
2 Claims. (Cl. 189—36)

The present invention is directed to a unitary structure formed from two members and specifically to the improvement whereby the two members are held together by crimping or upsetting a portion of one of the members with respect to the other member to provide a friction fastening therebetween.

Crimping or upsetting a first member with respect to a second member to form a unitary structure is of course old in the art. For example, for quite some time certain types of metal containers have been produced wherein a first member, for example the bottom member, has been attached to a second member, for example a side member, by crimping or upsetting the exterior peripheral surface of the bottom member so as to frictionally engage or be arranged to engage the lowermost surface of the side member, or vice versa, thereby providing a unitary container structure. However, the present invention is utilized in applications wherein a portion of a first member is to be disposed and held in an interior opening of a second member. Usually, heretofore, in this type of application, conventional fastening means were required to physically hold the members in position. Thus, welding, screw fasteners, spring retainers, etc., were utilized. As always, a simpler and cheaper mode of fastening such an arrangement of members is constantly being sought and this is accomplished by the present invention.

By incorporating the principles set forth herein, it is possible to provide a unitary structure formed from two members, a first of said members having a portion disposed within an interior opening of a second of said members without necessitating conventional fastening means. Thus, by upsetting rather than removing the material required to provide an opening in the second member through which the first member can be passed and in which a portion of the first member can be disposed and then forcing the upset material toward the original position, a unitary structure results as an excess of material arises, due to the portion of the first member disposed in the opening of the second member, which forcing causes a crimping effect of such excess material against the other member thereby forming a crimped friction fastening between the members.

The embodiment shown and described herein is concerned with a particular form of furnace control housing structure, but the principles presented herein are of general application. It may be here noted that the furnace control apparatus per se is disclosed in my co-pending application Serial No. 649,462, filed March 29, 1957, now Patent Number 2,848,582, and assigned to the instant assignee.

It is an object of this invention to provide a unitary structure formed from a plurality of members wherein a portion of a first of said members is disposed in an interior opening of a second of said members which opening is formed by upsetting a portion of the second of said members and wherein said first member is held in position with respect to said second member by a crimping of a part of said upset portion against the first member.

This and other objects will become more apparent from a reading of the following specification and appended claims wherein:

FIGURE 6 is a view of the assembly of the furnace control housing structure shown in position in a die body of a die prior to final fabrication.

FIGURE 7 is a view of the assembly of the furnace control housing structure shown in position in the die body with the punch portion of the die in the position obtained at the instant the final fabrication has been completed.

FIGURE 8 is a view of the unitary furnace control housing structure after final fabrication and removal from the die.

FIGURE 9 is a view of the unitary furnace control housing structure taken along lines 9—9 of FIGURE 8.

Figure 1:
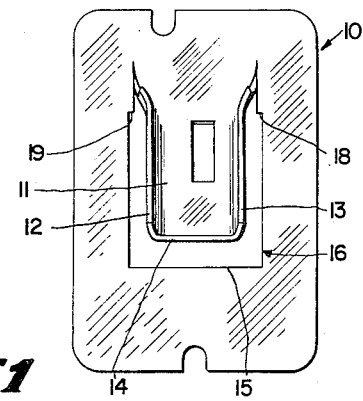
FIGURE 1 is a view of a mounting plate of a furnace control housing structure.
Figure 2:
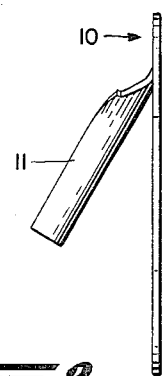
FIGURE 2 is a right side view of the mounting plate of FIGURE 1.

In FIGURES 1 and 2, a mounting plate 10 for a furnace control housing structure is shown having a cantilever portion 11 upset a slight distance from the main body of the plate 10. It should be noted that during the upsetting procedure resulting in the plate 10 as shown in FIGURES 1 and 2 no material is actually physically disassociated from the plate 10. That is, the cantilever portion 11 formed constitutes all the material displaced to form opening 16. The cantilever portion 11 is generally of a channel form and includes side elements 12 and 13 and has a lower edge 14 which prior to the forementioned upsetting was integral with the lower edge 15 of the opening 16. The upsetting of cantilever portion 11 results in notches 18 and 19 being formed in the opening 16.

Figure 3:
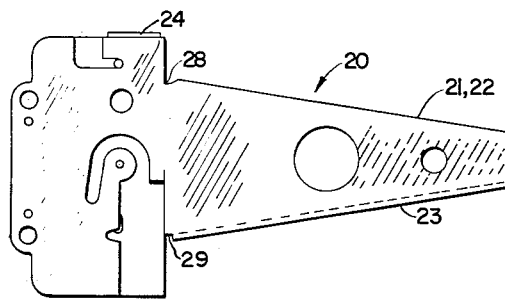
FIGURE 3 is a view of the frame of the furnace control housing structure.
Figure 4:
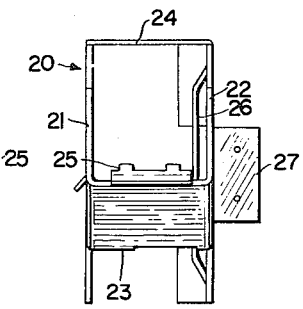
FIGURE 4 is a right side view of the frame of FIGURE 3.

The frame 20 of the furnace control housing structure is shown in FIGURES 3 and 4. The frame 20 is basically in the form of a channel member having parallel side elements 21 and 22 joined by a bottom element or web 23. It will be noted that the left hand portions of the side elements 21 and 22, as viewed in FIGURE 3, are a great deal larger than the basically triangular shaped right hand portions of the forementioned elements. An extension 24 of the side element 22 is bent at right angles to the side element 22 so as to abut the top surface of the left hand portion of the element 21. A tang 25 is formed at the extremity of the bottom portion of the web 23 and is provided to accommodate a bi-metal or similar element, not shown. Side element 22 has a portion 26 upset therefrom to act as a guide for an adjusting member, not shown, which co-operates with the forementioned bi-metal. The element 22 also has formed integral therewith a tab 27 which is located proximate to the portion 26 and which is arranged to accept a scale, not shown, to be used in conjunction with the adjusting lever, not shown. Both side elements 21 and 22 include a depression or recessed portion 28 and a notch 29, the functions of which will become apparent below.

Figure 5:
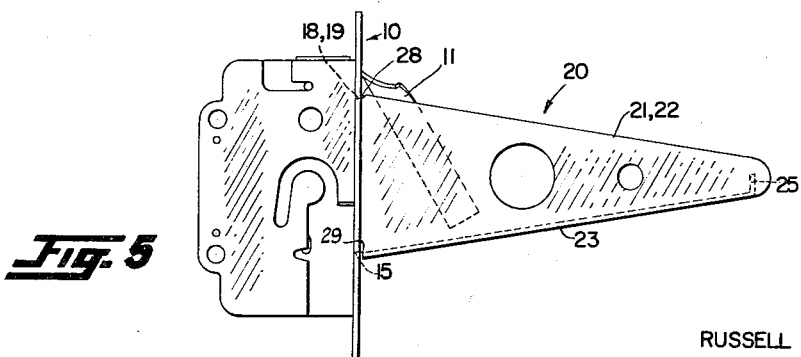
FIGURE 5 is a view of the mounting plate and frame of the furnace control housing structure loosely assembled prior to final fabrication.

The opening 16 provided in the mounting plate 10 and the shape of the cantilever member 11 are so chosen that the side elements 21 and 22 and the web 23 of the frame slidably accommodate each other. Before the plate 10 reaches its final position the side elements 21 and 22 are squeezed towards each other so that they may be positioned in the spaces to the interior of and above the notches 18 and 19. When the lower edge 15 of opening 16 is at the notch 29 the plate 10 is moved upwardly and elements 21 and 22 snap into engagement with notches 19 and 18 at the recessed portions 28. It may be noted here that the extension 24 of side element 22 merely abuts the side element 21 and slides with respect thereto when elements 21 and 22 are squeezed together. Thus, in FIGURE 5, the mounting plate 10 and the frame 20 are shown in assembled relation prior to final fabrication. It will be noted that the cantilever portion 11 extends rightwardly as viewed in FIGURE 5 and towards the tang 25. In assembly, the plate 10 rests against the left hand portions of the side elements 21 and 22 which act as stop portions and the notches 18 and 19 are disposed in the depressions 28 of the side elements 21 and 22. The lower edge 15 of the opening 16 is in a plane with the upper surface of the bottom element 23 at the notch 29, for reasons which will become apparent below.

With the mounting plate 10 and the frame 20 in assembled relation, the entire assembly is disposed in the die body 31 of a die, as shown in FIGURE 6. The die body 31 includes a relief 32 which accommodates the mounting plate 10. FIGURE 6 also shows a keeper member 33 of the die and a punch member 34 of the die. As the punch member 34 begins its upward movement the keeper member 33 moves horizontally between the side elements 21 and 22 of the frame 20 and also moves vertically finally resting on the upper surface, as shown in FIGURE 7, of the mounting plate 10.

As shown in FIGURE 7, the keeper member 33 and the punch member 34 of the die are at their ultimate positions and the cantilever portion 11 has been driven upwardly against the keeper member 33.

The relative movement between the cantilever member 11 and the remainder of the plate 10 and the frame 20 results in the cantilever portion 11 assuming a position substantially the same as that previous to its being upset. However, it will be noted, as shown in FIGURE 8, that portions of the elements 12 and 13 are displaced from the plane of the mounting plate 10. This is due to the fact that portions of the side elements 21 and 22 are now disposed in what was the opening 16 and the cantilever portion 11 originally being all the material removed to form opening 16 is not now capable of assuming its original position. The punch 34 of the die is so designed that the excess portions of the elements 12 and 13 are driven against the interior surfaces of the side elements 21 and 22 causing a crimping of the portions 12 and 13 against the inside surfaces of the elements 21 and 22 resulting in a friction fastening therebetween and thereby resulting in a unitary structure of plate 10 and frame 20 being formed.

From an examination of FIGURE 9, it can be seen that the lower edge 14 of the cantilever member 11 coincides with the lower edge 15 of the opening 16, so that no crimping results along the plane perpendicular to the length of the portions 12 and 13 of the cantilever member 11. This is due to the fact that the opening in the plate 10 is so arranged with respect to the upper surface of the bottom element 23 that when assembled the plane of the lower edge of the opening 16 and the plane of the upper surface of the member 23, at the point of contact therebetween, coincide. While in the present embodiment the lower edge element of the cantilever portion does not cooperate with the upper surface of the bottom element to result in a friction fastening therebetween, as pointed out above, it is apparent that this could be accomplished if so desired.

It can be seen that by providing a member with a cantilever portion upset from the member and the opening resulting therefrom slidably accommodating a second member, an arrangement has been devised whereby disposing the cantilever portion toward its original position results in crimping one of the members with respect to the other which thereby results in the formation of a unitary structure. The two members so provided and so formed together require no external fastening means nor do they require extensive interlocking portions to maintain their unitary condition.

While the preferred embodiment as set forth in the specification and drawing is directed to a furnace control housing structure, it is obvious that the principles set forth could be incorporated in numerous modifications. Therefore, the proper scope of this invention should be determined from the following claims, in which I claim:

1. A sheet metal assembly comprising, a U-shaped frame of sheet metal having spaced parallel side elements and an integral web connecting said side elements, and a generally flat plate disposed transversely of said side elements intermediate the ends thereof with said side elements extending through said plate and said web abutting said plate, said side elements each having a recessed portion in the edge opposite said web at the area of intersection of said elements with said plate, said plate having edge surfaces within its area in engagement with one side of each of said side elements throughout substantial portions of their lateral extent, said plate having a tongue whose edge surfaces are displaced from the general flat configuration of the plate and frictionally engage the adjacent opposite sides of each of said side elements throughout said substantial portions of their lateral extent, and said plate having further edge surfaces extending into and engaging the recessed portions of said side elements.

2. A sheet metal assembly comprising, a U-shaped frame of sheet metal having spaced parallel side elements and a generally flat plate disposed transversely of said side elements intermediate the ends thereof with said side elements extending through said plate and said web abutting said plate, said side elements being of reduced width each having a recessed portion in the edge opposite said web at the area of intersection of said side elements with said plate, said plate having edge surfaces within its area in engagement with one side of each of said side elements throughout substantial portions of their lateral extent, said plate having a tongue whose edge surfaces are displaced from the general flat configuration of the plate and frictionally engage the adjacent opposite sides of each of said side elements throughout said substantial portions of their lateral extent, said tongue being of such shape that said edge surfaces would meet said first mentioned edge surfaces if formed to the flat configuration of the remainder of the plate, and said plate having further edge surfaces extending into and engaging the recessed portions of said side elements.

References Cited in the file of this patent

UNITED STATES PATENTS

| | | |
|---|---|---|
| 1,184,309 | Berson | May 23, 1916 |
| 1,346,426 | Scherbner | July 13, 1920 |
| 2,120,470 | Patterson | June 14, 1938 |
| 2,305,918 | Belsky | Dec. 22, 1942 |

FOREIGN PATENTS

| | | |
|---|---|---|
| 51,687 | Austria | Jan. 10, 1912 |
| 563,856 | Germany | Nov. 10, 1932 |